Nov. 12, 1963  W. MARKS ET AL  3,110,178
DISPOSABLE ACCELEROMETER WAVE BUOY
Filed Sept. 30, 1958  5 Sheets-Sheet 1

*INVENTORS*
WILBUR MARKS
ROBERT G. TUCKERMAN
BY  WILLIS S. CAMPBELL

*ATTORNEYS.*

INVENTOR.
WILBUR MARKS
ROBERT G. TUCKERMAN
WILLIS S. CAMPBELL
BY
ATTORNEYS.

3,110,178
DISPOSABLE ACCELEROMETER WAVE BUOY
Wilbur Marks, Rockville, and Robert G. Tuckerman and
  Willis S. Campbell, Gaithersburg, Md., assignors to the
  United States of America as represented by the Secretary of the Navy
Filed Sept. 30, 1958, Ser. No. 764,460
7 Claims. (Cl. 73—170)
(Granted under Title 35, U.S. Code (1952), sec. 266)

This invention described herein may be manufactured and used by or for the Government of the United States of America for governmental purposes without the payment of any royalties thereon or therefor.

This invention relates to a disposable accelerometer wave buoy and more particularly to a system for measuring and recording the vertical acceleration of a floating buoy as a function of time whereby the state of the sea may be determined.

Ocean-going ships, particularly the military type, must go to sea and, in principle, perform their duties without damage or loss in performance due to the severest storm and wave conditions. Their seaworthiness or seakeeping ability must be adequate for the job, predictable from model tank tests, and improved upon in future models.

Ships respond to waves by rolling, pitching, heaving, etc. This response of a ship depends on the state of the sea, the geometry of the ship, its mass distribution, speed, and relative heading to the waves. If the nature of the ship is considered constant then the state of the sea will determine its performance. Excessively high waves may cause structural damage, the shipping of water over the bow, reduced speed, and excessive roll or pitch. A ship is deemed seaworthy if it can traverse the seas and perform its appointed tasks. Seaworthiness trials are conducted in order to determine the effects of the sea on ships and to define those sea conditions wherein a particular ship is seaworthy. Changes in ship design to improve seaworthiness may also be suggested by such tests.

In order to evaluate ship behavior it is necessary to specify the state of the sea in which the ship is being tested. This description of the wave field is essentially the scale by which all ship performance is measured.

It is therefore the primary purpose of this invention to provide a wave buoy which will accurately measure the state of the sea during seaworthiness tests.

According to an embodiment of the invention there is employed a floating buoy which is free to move with the waves, an accelerometer mounted on the buoy to measure the resultant movement of the buoy, and a telemetering transmitter to transmit the acceleration information back to a receiver and recorder, which for convenience are usually mounted on the ship undergoing seaworthiness trials.

Another object of this invention is to provide a simple and inexpensive wave measurer which may be thrown away or abandoned after use.

In the past a number of different systems have been proposed to measure the state of the sea which are unsuitable for seaworthiness trials or are prohibitively expensive.

Ship borne wave recorders or attached floating wave measuring devices are highly inaccurate if the ship is moving, such as during seaworthiness trials. Pressure transducers suffer from attenuation of high frequency waves with depth; they are usually mounted on the ocean bottom and connected to the shore by a cable and therefore not practical for use in the open ocean.

Airborne radar altimeters require attending aircraft which makes testing very expensive.

Stereo-photography of the waves from the ship undergoing seaworthiness trials has been proposed, but the field of view of the waves from the ship may be limited to the nearest waves while the ship's motion introduces further errors. The reduction of the data is slow and difficult and therefore expensive.

Floating capacitance or resistance poles have been proposed by Former, Marks et al., in "A Technique for Ocean Wave Measurements," published in 1955 by the Council on Wave Research and the SNAME in The Proceedings—First Conference on Ships and Waves, which measure the wave pattern as the water moves past the pole. These poles are large, expensive, difficult to launch and retrieve, have a limited wave amplitude response, and have a natural period of oscillation which interferes with the wave measurement.

The present novel system has an unlimited wave amplitude response, and oscillations at its natural period in the water are insignificantly small and highly damped.

Other objects and advantages of the invention will hereinafter become more fully apparent from the following description of the annexed drawings, which illustrate a preferred embodiment, and wherein.

Figure 1:
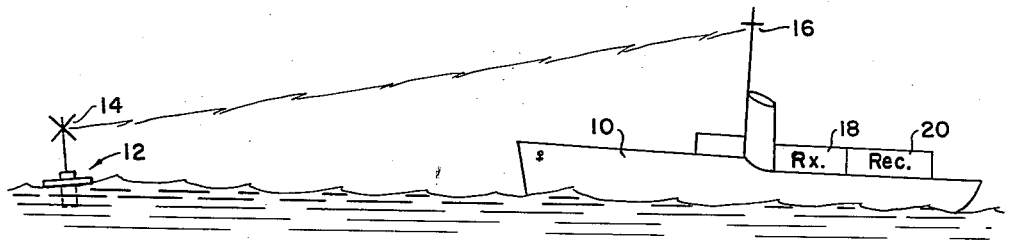
FIG. 1 is a pictorial view of the invention in operation in conjunction with a ship undergoing seaworthiness trials.

Referring now to the drawings, wherein like reference characters designate like or corresponding parts throughout the several views, there is shown in FIG. 1 a ship 10 undergoing seaworthiness trials in the vicinity of the disposable accelerometer wave buoy 12, which measures the acceleration of the waves and transmits the information by means of a radiant energy device including a telemetering antenna 14 to the ship 10.

The ship 10 has a receiving antenna 16 which is connected to a receiver 18 and a recorder 20.

Figure 2:
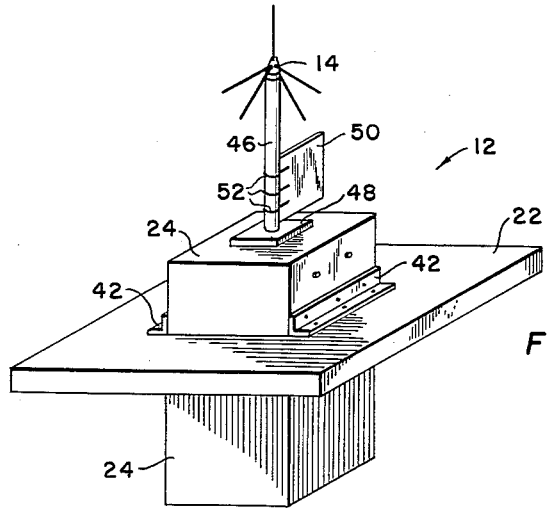
FIG. 2 is an isometric view of the wave buoy showing the overall construction and the telemetering antenna.

Referring to FIG. 2, the buoy 12 comprises a buoyancy means 22, a box 24 for holding an accelerometer and a radio transmitter, and an antenna 14.

Figure 5:
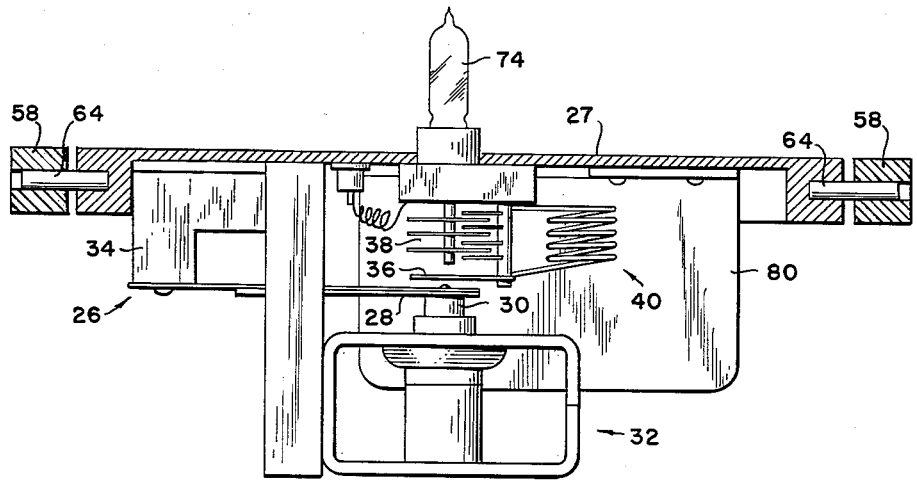
FIG. 5 is a detail view, partly in cross-section, of the gimbal bearing mounted accelerometer and radio transmitter.
Figure 3:
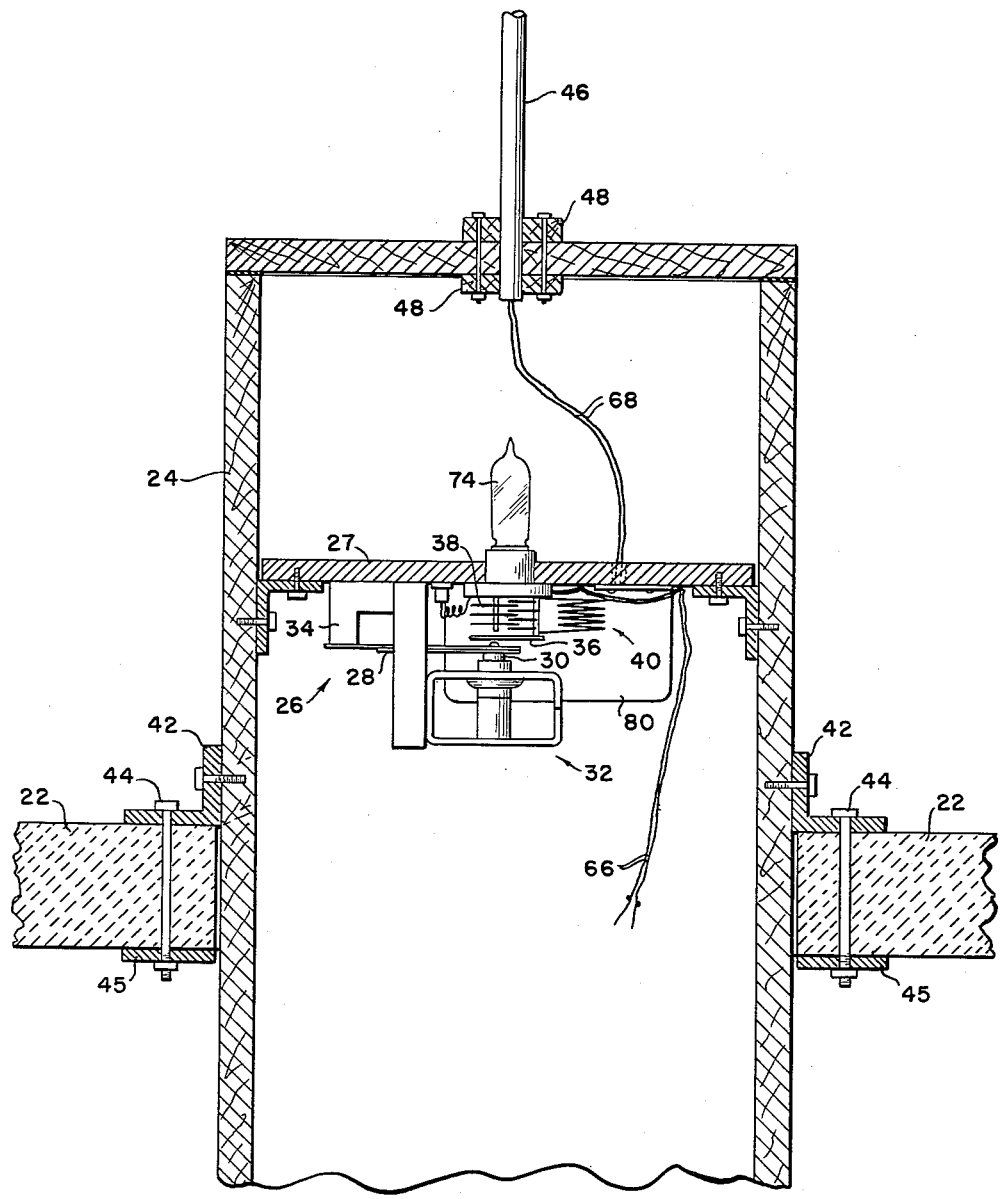
FIG. 3 is an elevation view, partly in cross-section, of the accelerometer and radio transmitter fastened to the box.
Figure 6:
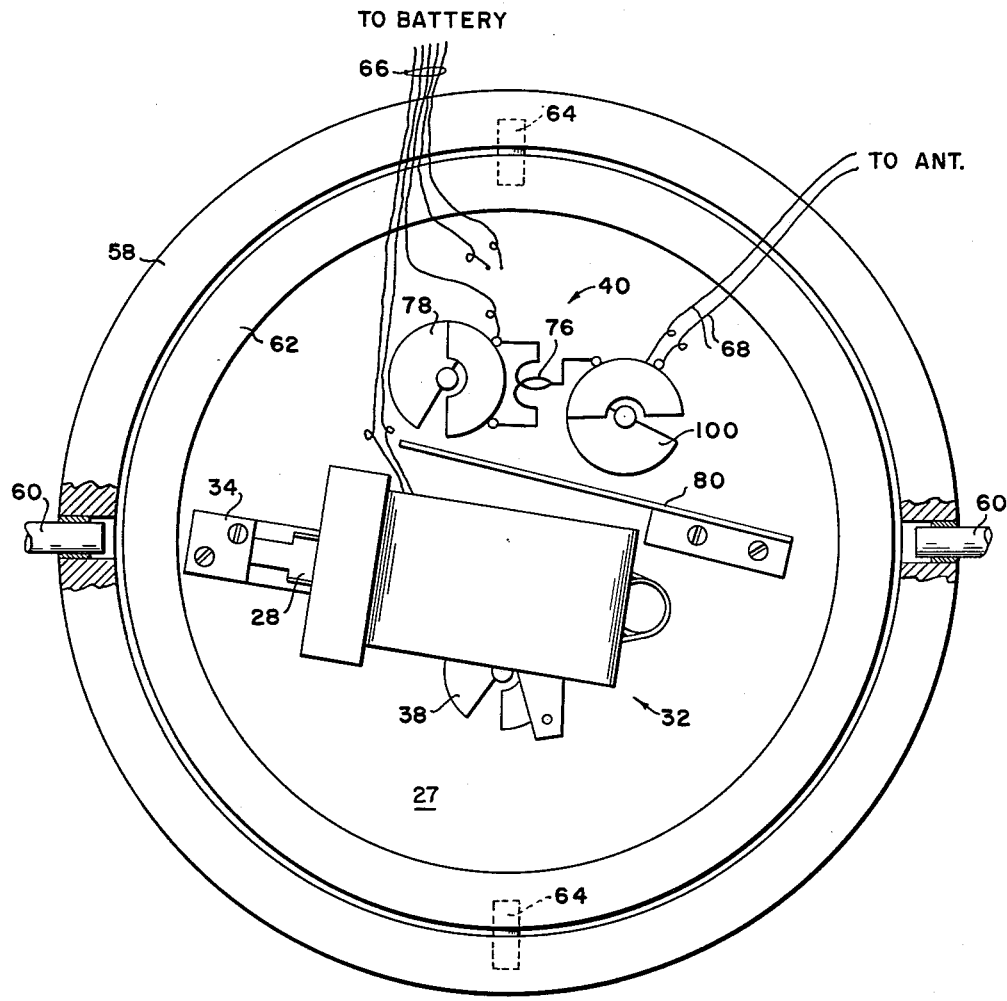
FIG. 6 is a plan view of the gimbal bearing mounted accelerometer and radio transmitter.

Referring to FIGS. 3, 5 and 6 the acceleromter 26 is shown comprising, a base 27, a Phosphor bronze leaf spring 28 supported as a cantilver, and having an aluminum, electrically conductive cylinder 30 attached to its free end. The cylinder 30 cooperates with a permanent magnet assembly 32 to provide dynamic damping. The conductive cylinder 30 cuts the lines of magnetic flux from assembly 32 which induces an electric current in cylinder 30, which in turn creates a magnetic field to oppose that of the assembly 32 to thereby slow down the movement of the cylinder 30 and provide dynamic damping. The fixed end of spring 28 is connected to electrical ground by its support 34 which is attached to base 27. The free end of spring 28 is mounted next to a plate 36 which is connected to the stator of a variable capacitor 38. The movement of the spring 28 as the buoy moves up and down on the waves changes the overall capacity of the capacitor 38 which is part of the frequency determining circuit of the radio transmitter 40. This capacity changed frequency modulates the transmitter 40 which energizes antenna 14 to transmit the information to the ship 10.

The normal radio range of the buoy 12 to the ship 10 equipped with the receiving antenna 16 mounted 50 feet above the water is about 10 miles which is usually sufficient since the buoy 12 will be thrown overboard while the ship goes through a series of maneuvers for seaworthiness tests. Since the buoys 12 are relatively inexpensive, easily handled, and require little stowage space, as many of them may be thrown overboard as are needed for different tests which may occur at different times and places during one voyage of the ship.

The recorder 20 will display a record of the acceleration of the float versus time. This recorded data is subjected to a spectrum analysis, either numerically or by means of an electronic filtering process to produce a curve of energy versus frequency of the waves, whereby the general statistical nature of the state of the sea may be calculated. This type of calculation is described in Pierson and Marks, "Power Spectrum Analysis of Ocean Wave Records," Trans. Amer. Geophys. Union, v. 33, 1952.

Referring to FIG. 2, the buoy 12 comprises a buoyancy means 22 made of a low density material such as Styrofoam weighing 4.5 lb./cu. ft., which in a specific instance was made by binding three 1' x 3' x 3" blocks together with one square foot cut out of the central block. The blocks were bound with fiberglass tape and covered with an epoxy resin consisting of 70% Versamid and 30% Shell 828.

The box 24 was made of ½" exterior plywood to 11½" x 11½" x 18" dimensions and covered with fiberglass cloth and an epoxy resin similar to the covering used on the blocks. Aluminum angles 42 are screw fastened to the box 24 while bolts 44 and plates 45 fasten the flotation 22 to the angles 42 as is more clearly shown in FIG. 4. A four foot aluminum rod 46 of ¾" diameter supports the buoy antenna 14 from the top of the box 24 where wooden pieces 48 provide additional support.

In a particular embodiment of the invention, a wind vane 50 made of a sheet of aluminum 12" x 18" x 1/16", is fastened to the rod 46 by means of 3 straps 52 wrapped around the rod and bolted to the vane. This vane 50 will point into the wind to keep the buoy 12 headed in the same general direction during a run and to eliminate rotation of the buoy around a vertical axis which may induce undesired accelerations.

Figure 4:
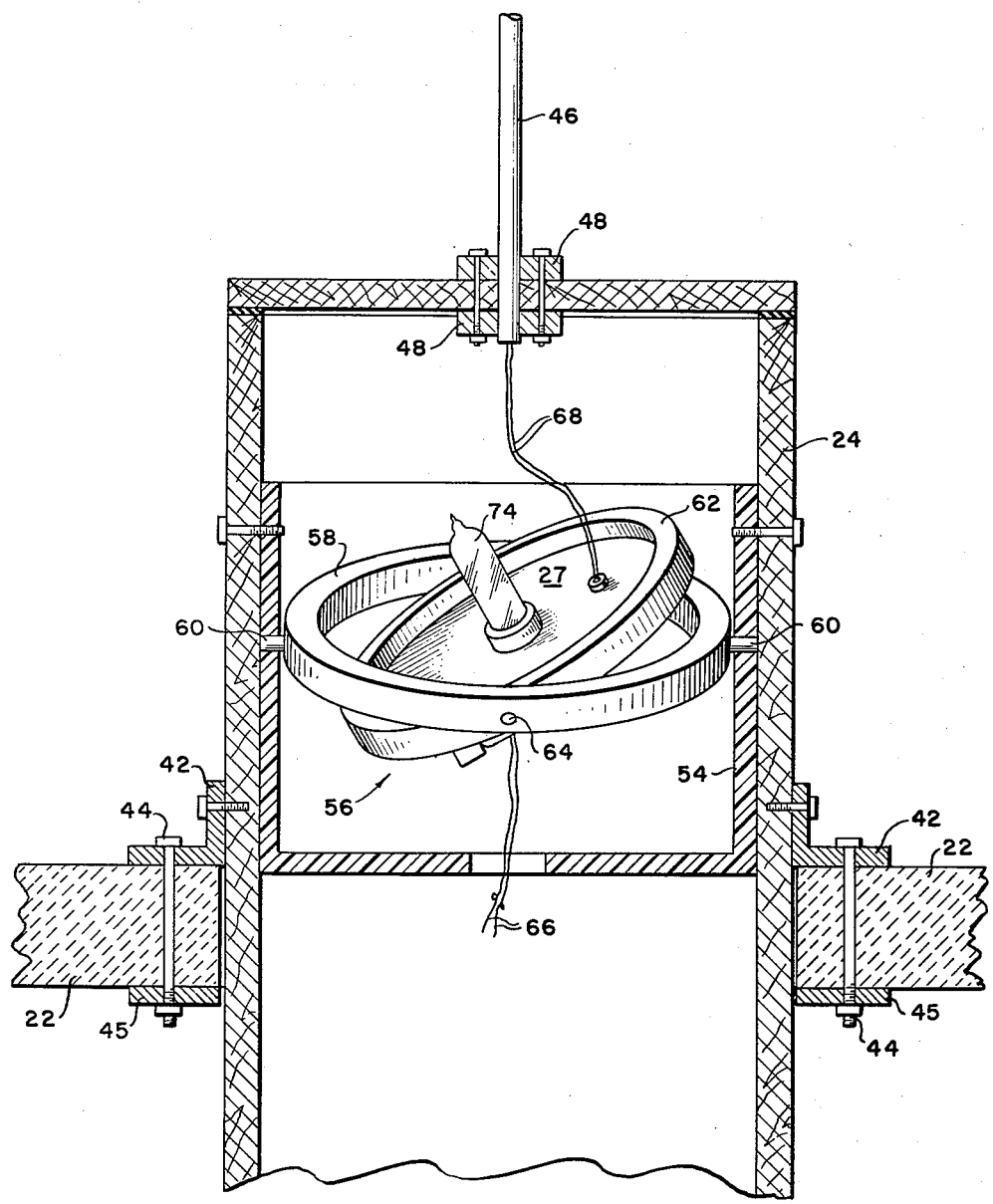
FIG. 4 is an elevation view, partly in cross-section, of the gimbal bearing mounted accelerometer and radio transmitter.

Due to the tilting of the buoy 12 as the waves move past, a modification was developed as shown in FIG. 4 where a housing 54 is fastened inside the box 24 to support a gimbal bearing 56 for the accelerometer 26 and transmitter 40. Gimbal bearing 56 comprises a first ring 58 pivotally mounted by bearings 60 to housing 54. A second ring 62 is pivotally mounted by bearings 64 to ring 58, which bearings 64 are placed 90° away from bearings 60. Ring 62 supports the accelerometer 26, base 27, and transmitter 40. A plurality of flexible leads 66 extend downward through housing 54 to a plurality of batteries (not shown) placed in the bottom of the box 24. A pair of flexible leads 68 extend from the output of the transmitter 40 to the antenna 14. This gimbal bearing eliminates the acceleration due to the pitch and roll of the buoy 12, but must be carefully damped, such as by having friction bearings for bearings 60 and 64, to avoid undesired oscillation of the accelerometer 26. In actual operation the pitch and roll of the buoy introduced a high frequency oscillation of short duration in the accelerometer output which could be eliminated in the data reduction since the oscillation is generally of much higher frequency than the fundamental wave frequency. Furthermore this oscillation is dependent upon the size and mass of the buoy and can be calculated or measured for buoys of the same class. For these reasons the modification shown in FIG. 3 is preferred over that shown in FIG. 4.

Figure 7:
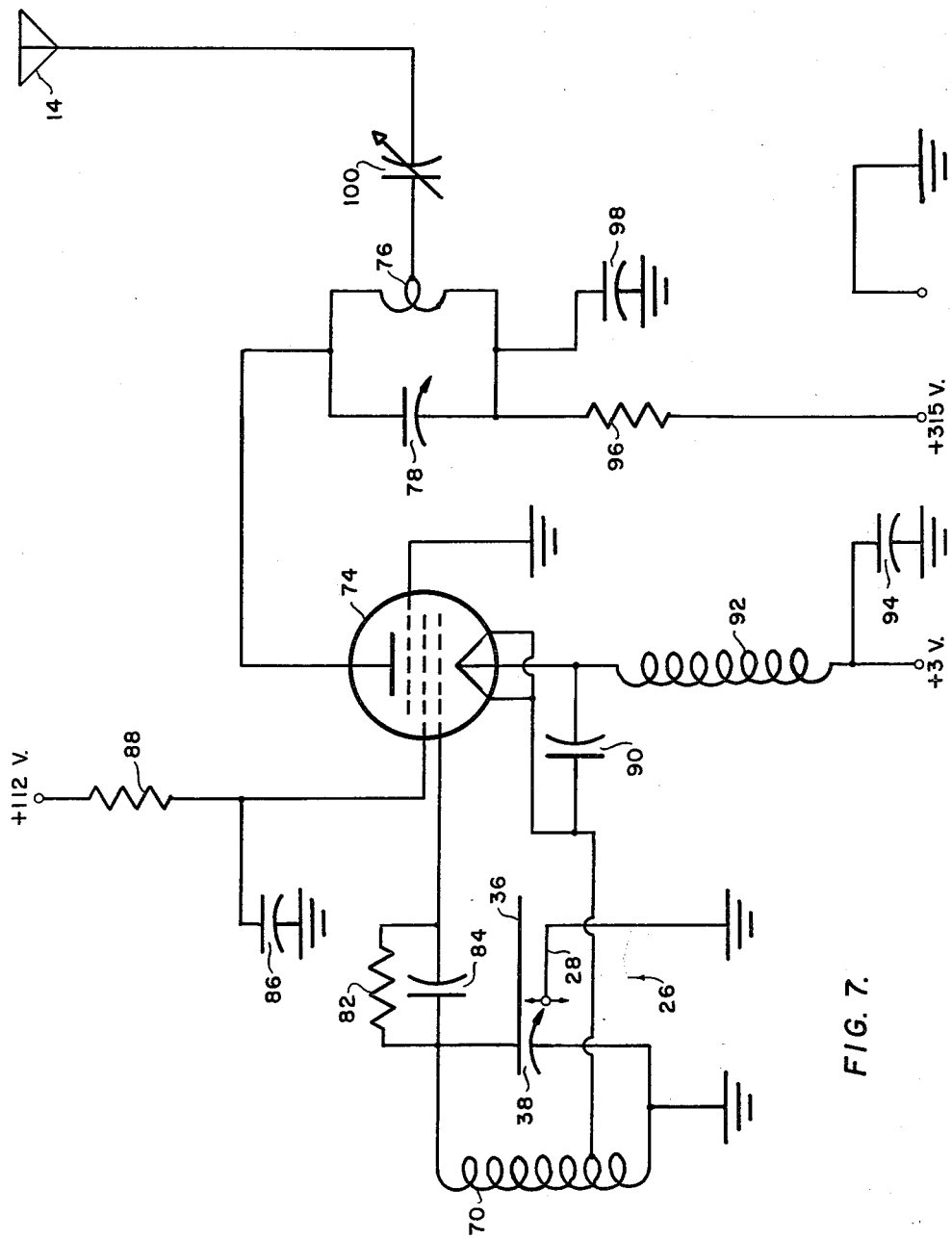
FIG. 7 is a schematic diagram of the radio transmitter.

Referring to FIG. 7, a schematic diagram of the radio transmitter 40 is shown, wherein coil 70 and capacitor 38 form the frequency determining tank circuit of an electron coupled oscillator with tube 74. Leaf spring 28 of accelerometer 26 is indicated as forming part of capacitor 38 with plate 36 whereby the frequency of the oscillator may be changed over a 100 kc. band in response to the acceleration of the buoy 12. The tank circuit of coil 70 and capacitor 38 is tuned to 66 mc. while the output tank circuit of coil 76 and capacitor 78 is tuned to the second harmonic or 132 mc. to reduce the loading of the frequency determining circuit.

An aluminum shield 80 is shown in FIGS. 3, 5, and 6 for further reducing any coupling between the two tank circuits.

In a specific embodiment of the invention, the following items were used:

Buoy antenna 14—A ground plane antenna cut for 132 mc., Antenna Mount Model GP-4 by Master Mobile Mounts, Inc., Los Angeles, Calif.
Receiver 18—AM-FM receiver, 50–200 mc., Model R-5200, Servo Corporation of America, New Hyde Park, N.Y.
Recorder 20—Model 150, Sanborn Co., Cambridge, Mass.
Permanent Magnet Assembly 32—4" speaker coil P4-X, Jensen Mfg. Co., 6601 S. Laramie Ave., Chicago 38, Ill.
Coil 70—6¾ turns tapped at 1¾ turns being ½" diameter and ½" long.
Tube 74—Type 5618.
Coil 76—2 turns, center-tapped, ½" dia., 1" long.
Capacitors 38, 78, and 100—25 micromicrofarads.
Resistor 82—33K ohms, ½ watt.
Capacitor 84—50 micromicrofarads.
Capacitors 86, 90, 94, 98—.001 microfarad.
Resistor 88—10K ohms, 1 watt.
Coil 92—7 turns, ¼" dia., ½" long.
Resistor 96—47 ohms.

Sufficient battery power was placed in the bottom of the box to run the transmitter for an eight hour period.

A simple, inexpensive, and efficient wave buoy has been provided which will measure the state of the sea in the presence of local currents or large waves in the water. One or more may be used to measure the sea state while a ship is undergoing seakeeping trials to provide quantitative data to accurately measure the seaworthiness of the ship.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A disposable accelerometer wave buoy for seaworthiness trials of a ship comprising an accelerometer having an output, means for freely floating said accelerometer on the surface of the sea, and means for telemetering the output of said accelerometer to said ship.

2. A disposable accelerometer wave buoy according to claim 1 but further characterized by said telemetering means comprising radiant energy means.

3. A disposable accelerometer wave buoy according to claim 2 but further characterized by a gimbal bearing between said accelerometer and said floating means whereby the pitch and roll of said buoy may be eliminated.

4. A disposable accelerometer wave buoy according to claim 2 but further characterized by said accelerometer comprising a leaf spring having a velocity damped mass attached thereto and variable output signal means including said leaf spring for producing output signals corresponding to relative movements between said velocity damped spring and said buoy.

5. A disposable accelerometer wave buoy according to claim 2 but further characterized by a wind vane attached to said buoy whereby spinning of said buoy may be reduced.

6. A system for measuring the state of the sea comprising an accelerometer having an output, means for freely floating said accelerometer on the surface of the sea, a ship, radiant energy means for transmitting the output of said accelerometer to said ship, and a receiver and a recorder mounted on said ship whereby said output may be recorded.

7. A disposable accelerometer wave buoy comprising an accelerometer having an output comprising a base, a permanent magnet attached to said base, a leaf spring having two ends atached by one end of said spring to said base, the other end of said spring being positioned for coaction with said permanent magnet whereby dynamic damping of said spring is provided; an output producing radio transmitter attached to said base and having a frequency determining capacitor formed by said leaf spring and a fixed electrode whereby the frequency of said transmitter is varied according to the movement of said spring; an antenna connected to said transmitter output for radiating the output of said transmitter; a waterproof box housing said base, accelerometer, and transmitter and supporting said antenna; and buoyancy means attached to said box whereby said buoy may freely float on the surface of the water.

References Cited in the file of this patent

UNITED STATES PATENTS

| | | |
|---|---|---|
| 2,665,896 | Kirby | Jan. 12, 1954 |
| 2,726,075 | Hosford | Dec. 6, 1955 |
| 2,774,058 | Raichel | Dec. 11, 1956 |
| 2,828,475 | Mason | Mar. 25, 1958 |
| 2,839,920 | MacAnespie | June 24, 1958 |
| 2,852,208 | Schlesman | Sept. 16, 1958 |